(12) United States Patent
Chen et al.

(10) Patent No.: US 12,101,756 B2
(45) Date of Patent: Sep. 24, 2024

(54) ADAPTIVE PARAMETER CONFIGURATION IN WIRELESS COMMUNICATION

(71) Applicant: ZTE Corporation, Guangdong (CN)

(72) Inventors: Mengzhu Chen, Guangdong (CN); Liguang Li, Guangdong (CN); Jun Xu, Guangdong (CN); Jin Xu, Guangdong (CN)

(73) Assignee: ZTE Corporation, Guangdong (CN)

( * ) Notice: Subject to any disclaimer, the term of this patent is extended or adjusted under 35 U.S.C. 154(b) by 506 days.

(21) Appl. No.: 17/245,198

(22) Filed: Apr. 30, 2021

(65) Prior Publication Data
US 2021/0307031 A1 Sep. 30, 2021

Related U.S. Application Data

(63) Continuation of application No. PCT/CN2018/113820, filed on Nov. 2, 2018.

(51) Int. Cl.
H04W 72/1263 (2023.01)
H04W 52/02 (2009.01)
H04W 72/0446 (2023.01)
H04W 72/0453 (2023.01)
(Continued)

(52) U.S. Cl.
CPC ... *H04W 72/1263* (2013.01); *H04W 52/0212* (2013.01); *H04W 72/0446* (2013.01); *H04W 72/0453* (2013.01); *H04W 72/23* (2023.01); *H04W 76/28* (2018.02)

(58) Field of Classification Search
CPC ......... H04W 72/1263; H04W 52/0212; H04W 72/0446; H04W 72/0453; H04W 72/23; H04W 76/28; H04W 8/22; H04W 88/02; H04W 52/0216; H04W 28/02; H04W 24/02; H04W 72/20; Y02D 30/70; H04L 5/0035; H04L 5/0055; H04L 5/001;
(Continued)

(56) References Cited

U.S. PATENT DOCUMENTS 9,699,667 B2   7/2017   Sampath et al.
2010/0118815 A1   5/2010   Kim et al.
2013/0016614 A1   1/2013   Suzuki et al.
(Continued)

FOREIGN PATENT DOCUMENTS

CN   101426256 A   5/2009
CN   102625421 A   8/2012
(Continued)

OTHER PUBLICATIONS

International Search Report and Written Opinion in International Application No. PCT/CN2018/113820, mailed Jul. 25, 2019, 6 pages.
(Continued)

*Primary Examiner* — Dady Chery
(74) *Attorney, Agent, or Firm* — Perkins Coie LLP

(57) ABSTRACT

Methods, systems, and devices for an adaptive parameter configuration in wireless communication are described. A wireless communication method is provided to comprise updating configuration parameters of a user device based on one or more messages including at least one of a parameter update indication, a parameter update inquiry, a parameter set, or a parameter index set.

14 Claims, 8 Drawing Sheets

(51) Int. Cl.
*H04W 72/23* (2023.01)
*H04W 76/28* (2018.01)

(58) Field of Classification Search
CPC ... H04L 5/0048; H04L 5/0053; H04L 1/0015; H04L 1/0023
See application file for complete search history.

(56) References Cited

U.S. PATENT DOCUMENTS

| | | |
|---|---|---|
| 2016/0021699 A1 | 1/2016 | Oh et al. |
| 2018/0042068 A1 | 2/2018 | Sebire et al. |
| 2018/0098280 A1 | 4/2018 | Choi et al. |
| 2018/0279408 A1 | 9/2018 | Jha et al. |
| 2019/0182849 A1 | 6/2019 | Lee et al. |
| 2020/0037246 A1* | 1/2020 | Hwang ............ H04W 52/0216 |
| 2020/0037396 A1* | 1/2020 | Islam ............... H04W 52/0229 |
| 2021/0037509 A1 | 2/2021 | Lin et al. |
| 2021/0167930 A1* | 6/2021 | Jeon ................. H04L 5/0098 |
| 2021/0259044 A1* | 8/2021 | Islam ................ H04W 72/535 |

FOREIGN PATENT DOCUMENTS

| | | |
|---|---|---|
| CN | 102763347 A | 10/2012 |
| CN | 102958118 A | 3/2013 |
| CN | 103582130 A | 2/2014 |
| CN | 104780608 A | 7/2015 |
| CN | 105340341 A | 2/2016 |
| CN | 105409317 A | 3/2016 |
| CN | 105453689 A | 3/2016 |
| CN | 105517020 A | 4/2016 |
| CN | 106060912 A | 10/2016 |
| CN | 107432048 A | 12/2017 |
| CN | 107734693 A | 2/2018 |
| EP | 2903227 A1 | 8/2015 |
| KR | 10-2010-0052064 A | 5/2010 |
| WO | 2014010902 A1 | 1/2014 |
| WO | 2015065076 A1 | 5/2015 |

OTHER PUBLICATIONS

CNIPA, Office Action for Chinese Patent Application No. 202111436239.X, mailed on Dec. 27, 2022, 6 pages.
IPOS, Search Report and Written Opinion for Singaporean Application No. 11202104558V, mailed on Jan. 11, 2018, 10 pages.
KIPO, Office Action for Korean Application No. 10-2021-7016708, mailed on Apr. 5, 2023, 11 pages with unofficial English summary.
CNIPA, Notification to Complete Formalities of Registration for Chinese Application No. 202111436239.X, mailed on May 18, 2023, 4 pages with unofficial English translation.
Indian First Examination Report mailed May 26, 2022 for Indian Patent Application No. 202147021120 (6 pages).
Extended European Search Report mailed May 30, 2022 for European Patent Application No. 18930486.8 (12 pages).
Qualcomm Incorporated, "Triggering Adaptation of UE Power Consumption Characteristics", 3GPP TSG-RAN WG1 Meeting #94bis, Chengdu, China, R1-1811283, 12 pages, Oct. 8-12, 2018.
Ericsson, "Signaling of DRX Start Offset", 3GPP TSG-RAN WG2 Meeting #63bis, Prague, Czech Republic, R2-085387 (updated R2-084003), 8 pages, Sep. 29-Oct. 3, 2008.
3GPP Standard; Technical Specification, "3rd Generation Partnership Project; Technical Specification Group Radio Access Network; NR; Medium Access Control (MAC) protocol specification (Release 15)", 3GPP TS 38.321, V15.3.0, 76 pages, Sep. 2018.
EPO, Communication under Rule 71(3) EPC for European Application No. 18930486.8, mailed on Oct. 4, 2023, 9 pages.
KIPO, Notice of Allowance for Korean Application No. 10-2021-7016708, mailed on Oct. 10, 2023, 10 pages with unofficial translation.
IPOS, Notice for Eligibility of Grant for Singaporean Application No. 11202104558V, mailed on Dec. 4, 2023, 4 pages.

* cited by examiner

S810 updating configuration parameters based on one or more messages

FIG. 8

ADAPTIVE PARAMETER CONFIGURATION IN WIRELESS COMMUNICATION

CROSS-REFERENCE TO RELATED APPLICATIONS

This application is a continuation of International Patent Application No. PCT/CN2018/113820, filed on Nov. 2, 2018, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for adaptive parameter configuration in wireless communication. The disclosed technology describes methods that can be implemented at a plurality of mobile devices (or terminals, or user equipment) or a plurality of networks (such as a base station, gNodeB) to prevent or reduce unnecessary power consumptions.

In one aspect, a wireless communication method is provided to comprise: a wireless communication method is provided to comprise updating configuration parameters of a user device based on one or more messages including at least one of a parameter update indication, a parameter update inquiry, a parameter set, or a parameter index set.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

BRIEF DESCRIPTION OF THE DRAWINGS

FIG. 8 shows an example of a wireless communication based on an implementation of the disclosed technology.

DETAILED DESCRIPTION

The disclosed technology provides implementations and examples of adaptive parameter configuration schemes for updating configuration parameters of a user device. Some implementations of the disclosed technology suggest techniques to prevent or reduce unnecessary power consumptions that are caused by nonoptimized configuration parameters with little or without consideration of the varying traffics in the wireless communication system.

In NR (New Radio), the power consumption of a user equipment (UE) is very large. Since the UE directly relates to the user's experience, the large power consumption of the UE results in undesired user experience. In the existing communication system, parameters of the UE are generally configured by a network, for example, a base station. The parameters configured by the network may become to unfit or nonoptimal for the varying traffics. In addition, the parameters configured by the network tend to be too aggressive or conserved, which may exaggerate the power consumption issue by causing the excessive power consumption.

Figure 1:
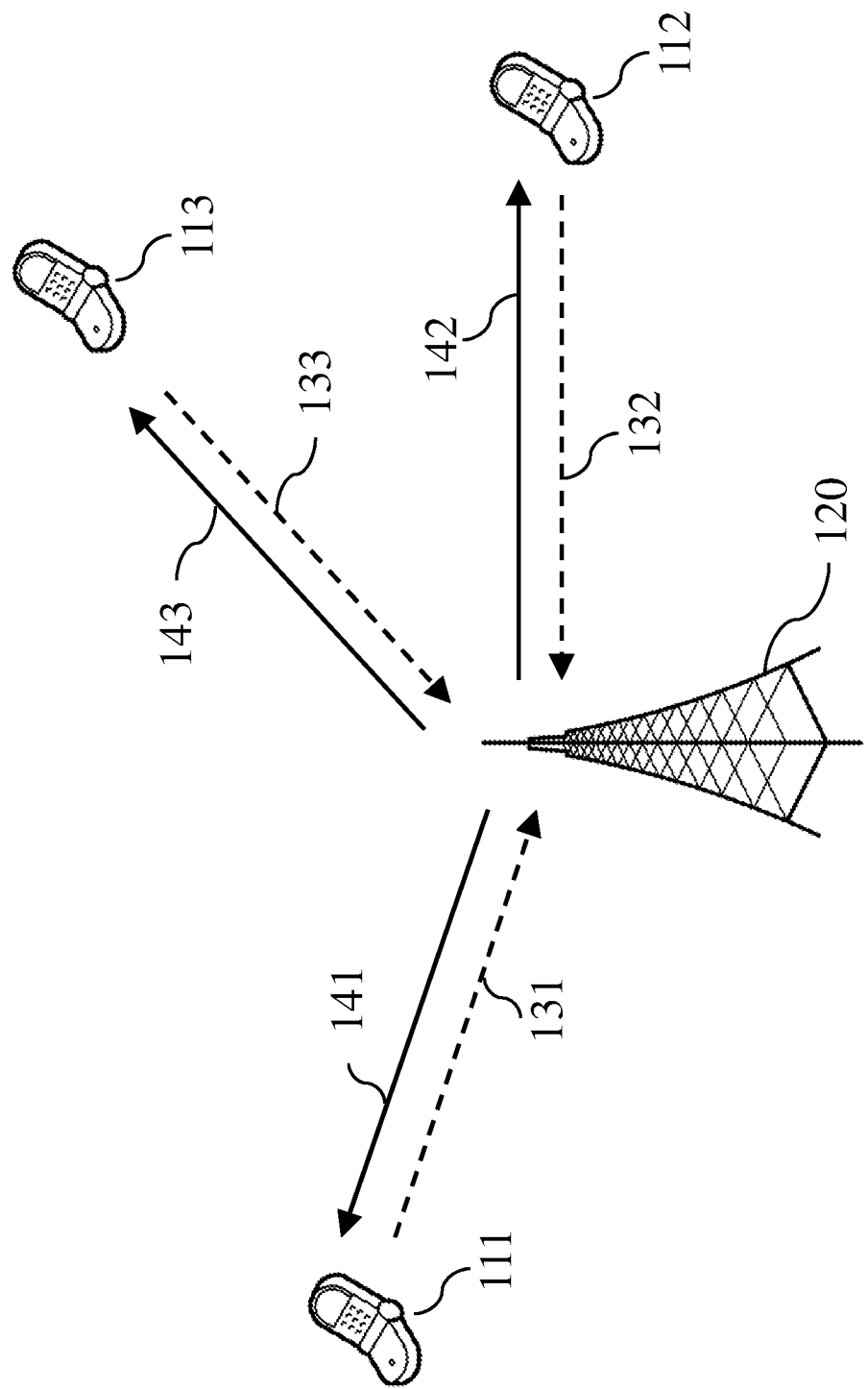
FIG. 1 shows an example of a base station (BS) and user equipment (UE) in wireless communication based on some implementations of the disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
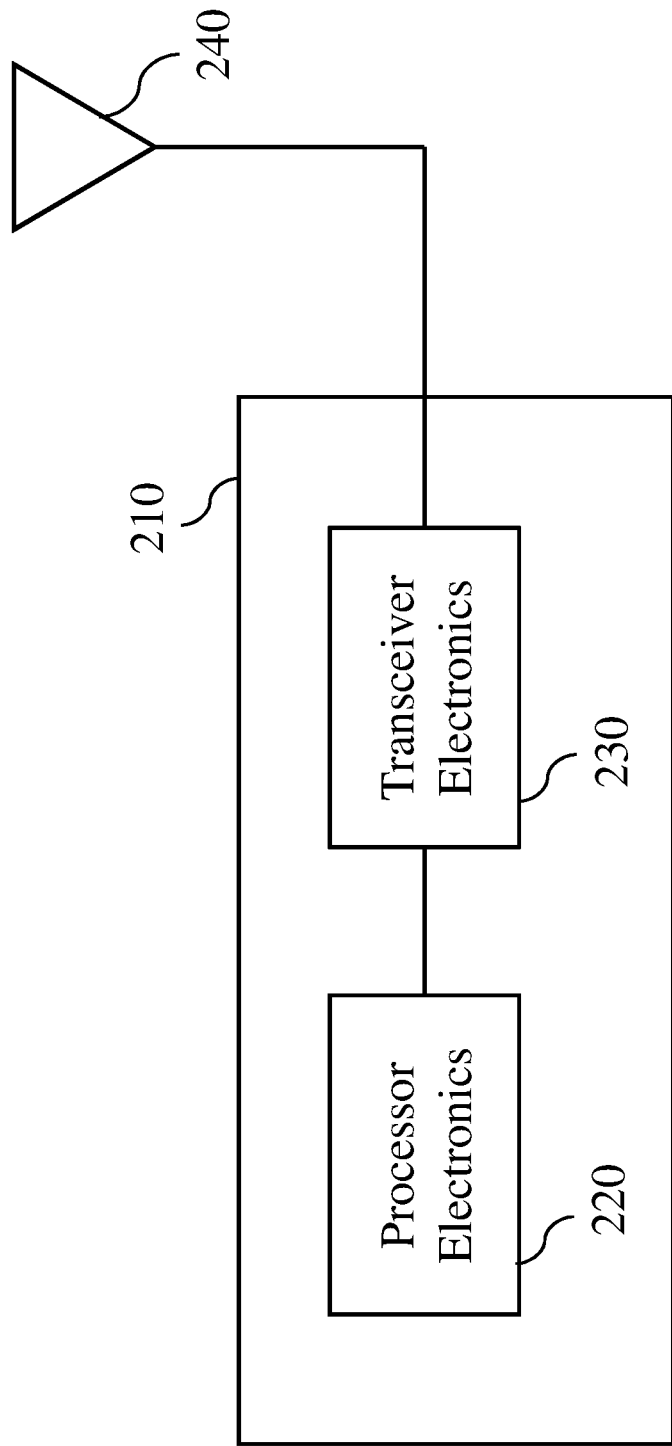
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

Figure 3:
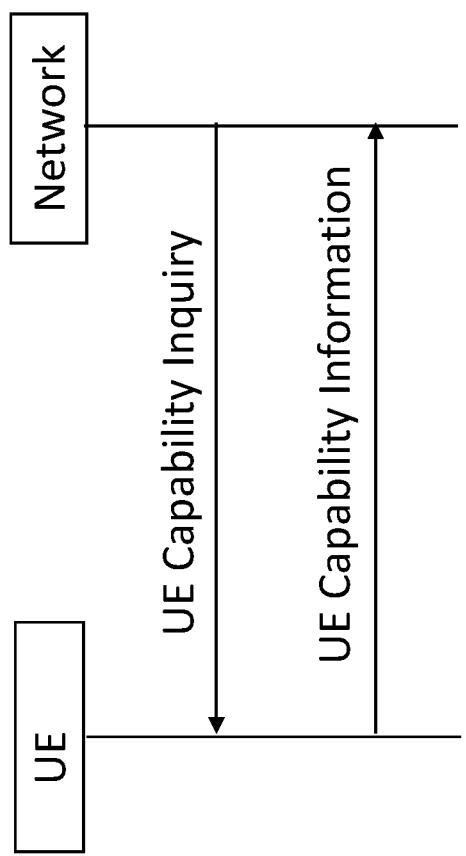
FIG. 3 shows a conventional process for inquiring the capability of a user equipment.

FIG. 3 shows a conventional process for inquiring capability of a user equipment (UE). The configured parameters include parameters such as time, frequency, spatial domain, and so on. As shown in FIG. 3, in the existing communication system, the network first sends a UE capability inquiry to UE. After the reception of UE capability inquiry from the network, the UE would report its capability information. Generally, the reported capability information is the maximum capability supported by the UE.

Based on the UE capability information and other information such as channel state information, the network decides the parameters for the UE. Thus, the UE is configured with the parameters and scheduled by the network. However, since there are always more than one UEs in a cell, the configuration parameters decided by the network may be not optimal for every UE. In addition, the traffic state may be dynamic and changeable, and some of the configuration parameters are semi-static and may remain the same in a certain period and so on. For at least the above reasons, unnecessary power consumption is caused.

The disclosed technology provides adaptive parameter configuration schemes to prevent or reduce the unnecessary power consumption and achieve the UE power saving. In some implementations in which the configurable parameters are included in a table, the parameter reconfiguration could be initialized by UE or network, and the updated parameter could be inferred from the table. Various parameter configuration schemes will be discussed below.

Scheme 1

Figure 4:
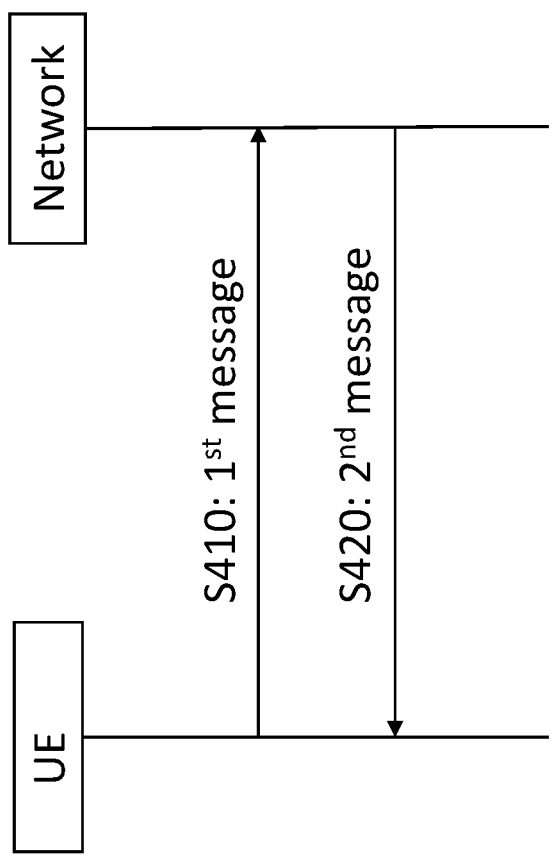
FIG. 4 shows an example of an adaptive parameter configuration method of the disclosed technology.

In this scheme, UE provides the configuration parameters to the network, and the network indicates its decision to UE. FIG. 4 shows an example of a process based on Scheme 1.

At 410, a first message is sent by the UE to the network. In some implementations, the first message may include at least one of a parameter update indication, a parameter update inquiry, a first parameter set, or a first parameter index set. The first parameter set may include one or more first parameters that are considered by the network as candidate parameters for configuring the UE. The first parameter index set may include indexes that indicate one or more first parameters that are considered by the network as candidate parameters for configuring the UE. In some implementations, the first parameter set or one or more first parameters may be a subset of a first parameter table. In some embodiment, the first parameter table may be stored in UE and network. In some implementations, the first parameter set may include one parameter with different values. In some implementations, the first message may be transmitted through at least one of the following way (a) a higher layer signaling, such as RRC (Radio Resource Control) signaling or MAC CE (MAC Control Element), (b) a Layer 1 signaling through such as PUCCH (Physical Uplink Control Channel) or PUSCH (Physical Uplink Shared Channel), or (c) a reference signal. The reference signal may include at least one of the following: SRS (sounding reference signal) or PT-RS (Phase tracking reference signal). In some implementations, the information conveyed by the reference signal may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain.

At 420, a second message is sent by the network to the UE. The second message may convey at least a second parameter set, a parameter update indication, or a second parameter index set for the UE configuration. In some implementations, the second parameter set may be a subset of the first parameter set. In some implementations, one or more second parameters indicated in the second parameter index set maybe a subset of the first parameter set. In some implementations, the second parameter set may be a subset of the first parameter index set. In some implementations, the second parameter set or one or more second parameters indicated in the second parameter index set may be a subset of a second parameter table. In some implementations, the second parameter table is stored in the network and UE. In some implementations, the second parameter table is a subset of the first parameter table. In some implementations, the first parameter table is a subset of the second parameter table. In some implementations, a partial part of the first parameter table is a subset of the second parameter table. The second message may be at least one of the following: higher layer signaling, such as RRC signaling, MAC CE, or DCI (Downlink Control Information) or reference signal. In some implementation, the reference signal may include at least one of the following: CSI-RS (channel state information reference signal), SS (synchronization signal), or SS/PBCH (physical broadcast channel) block.

In this patent document, a signal or message sent by the network could also be described as a signal or message received by the UE. In the same manner, a signal or message sent by the UE could also be described as a signal or message received by the network. Accordingly, signals and messages described in this patent document, which are discussed as signals and messages transmitted from the UE or the network, could be understood to cover signals and messages transmitted to the UE or the network.

In some implementation, the information conveyed in the first and/or second message is determined with a priority or predefined order. In some implementation, within the priority or predefined order, at least one of the following parameters have highest priorities: slot offset for scheduling, PDCCH monitoring related parameters, DRX configuration parameters.

In some implementations, information included in the first message is a bitmap indicating the first parameter table. In some implementations, information included in the second message is a bitmap indicating the second parameter table. In some implementations, information included in the second is a bitmap indicating the information in the first message.

In some implementation, the number of bits of information indicated in the second message is determined based on the information in the first message. In some implementation, the number of bits of information indicated in the second message is determined based on the maximum number of parameter sets or parameter index sets supported by the first message. In some implementation, the information conveyed in the second message may be interpreted based on information indicated in the first message. The information indicated in the first message may be varied and then the information in the second message may have different indications. For example, when the first message conveys information, [parameter1, parameter2], the second message may convey "0" in response to the first message. In this case, information "0" conveyed in the second message may be interpreted that the UE needs to use parameter1. For other cases that the second message does not include "0", the UE is configured with parameter2. When the first message conveys information, [parameter3, parameter4] and the second message conveys "0." information "0" conveyed in the second message may be interpreted that the UE needs to use parameter3. For other cases that the second message does not include "0," the UE is configured with parameter4.

In some implementation, the first message may be a higher layer signaling, such as RRC signaling or MAC CE. The first message sent by the UE indicates one or more sets of parameters. The second message, such as DCI or reference signal, is sent by the network to indicate the parameters to be used for configuring the UE.

In some implementation, the first message may be sent through PUCCH, PUSCH, or reference signal. The first message sent by the UE indicates one or more sets of parameters or an inquiry for parameter update. The second message, such as DCI or reference signal, is sent by the network to indicate the parameters to be used for configuring the UE.

In some implementation, both the first message and the second message are indicated by reference signals. In some implementations, the reference signals may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain.

In some implementation, the information included in first or second the message would be invalid or de-activated if a timer is expired or a higher layer parameter or a L1 signaling is transmitted or received.

In some example, the first parameter table and/or second parameter table is a subset of a power saving parameter table. The first parameter table could be downloaded by the information indicated in the first message. And the parameters selected from the first table for UE configuration could be indicated by the information in the second message. The indication can be provided in a dynamic and power efficient way.

Scheme 2

In this scheme, the network sends one or more message to the UE to inform the parameter update. In response to receiving the message, the UE updates its configuration. In some implementations, at least one of the messages may be or include a parameter set, parameter index set, parameter update indication. In some implementations, one or more parameters indicated in the message may be a subset of a parameter table. The parameter table may be stored in the network and UE. In some implementations, the message may be transmitted through at least one of the following signaling: (a) a higher layer signaling, such as RRC signaling or MAC CE, (b) a Layer 1 signaling through such as PDCCH or PDSCH, or (c) reference signal. The reference signal may include at least one of the following: CSI-RS (Channel State Information Reference Signal) or SS (synchronization signal) or SS/PBCH block or PT-RS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain.

In some implementations, the reference signals and/or PDCCH and/or signaling may be UE-specific or UE group specific. In some embodiments, the size of the group may be configured. In some embodiment, the group is related to the updated parameters or parameter set.

In some implementation, at least one of one or more reference signals or one or more PDCCHs and/or signalings is allocated at a predefined resource or predefined resource set. The resource may include one of the following: time/frequency/spatial domain resource.

In some embodiment, the predefined resource or predefined resource set could be configured by higher layer parameter, such as RRC signaling or MAC CE. In some implementation, the reference signals and/or PDCCH and/or signaling is associated with at least a predefined reference signal or/and channel. The predefined reference signal may include at least one of the following: DM-RS, PT-RS, CSI-RS, SS, SS/PBCH block, SRS, PDSCH, PDCCH, PUSCH, PUCCH, or PBCH. In some implementation, the reference signals and/or PDCCH is transmitted at the Pcell (primary cell). In some implementation, unless activated by another signaling or timer, the active BWP after the reference signals and/or PDCCH reception is the BWP that the reference signals and/or PDCCH is transmitted. In some embodiment, the reference signals and/or PDCCH and/or signaling is transmitted within a special BWP (bandwidth part). In some embodiment, the bandwidth of second signaling is larger than the first signaling. In some embodiment, the first reference signals and/or PDCCH and/or signaling is transmitted within a special BWP. The special BWP has at least one of the following characteristics: the smallest bandwidth, smallest index, the smallest ID (identifier), PDCCH monitoring is disabled, uplink or downlink grant is not allowed, CSI measurement is enabled, RRM (Radio Resource Management) measurement is enabled, the number of transmission layer is limited to a first threshold value, the number of antenna ports is limited to a second threshold value, the number of antenna panel is limited to a third threshold value, the PDCCH monitoring periodicity is limited to a fourth threshold value, the package transmitted within it is no greater than a fifth threshold, the transport block within it is no greater than a sixth threshold. The first to sixth threshold values are non-negative.

In some implementations, the information conveyed by the reference signal may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain.

In some implementation, the information conveyed in the message is determined with a priority or predefined order. In some implementation, within the priority or predefined order, at least one of the following parameters have highest priorities: slot offset for scheduling, PDCCH monitoring related parameters, DRX configuration parameters.

In some implementation, information included in the message is a bitmap indicating the parameter table.

In some implementation, the information included in the message would be invalid or de-activated if a timer is expired or a higher layer parameter or L1 signaling is transmitted or received.

In the below, Schemes 2-1 to 2-3 are further discussed. Since Schemes 2-1 to 2-3 are performed under Scheme 2, the descriptions for the Scheme 2 can be applied to Schemes 2-1 to 2-3 accordingly. In addition, the descriptions for a particular part (for example, the signaling) of Schemes 2. Schemes 2-1 to 2-3 can be applied to others of Schemes 1 to 6 For the simplicity of the explanations, the same descriptions have not repeated for each of Schemes 2-1 to 2-3.

Scheme 2-1

In this scheme, the network sends a message to the UE through at least one of one or more reference signals or one or more PDCCHs to inform the parameter update. In some implementations, when at least two signaling are used to send the message, the following information of a latter signaling is indicated by the former signaling. In some embodiment, the signaling could be at least one of a reference signal, PDCCH:
  a. The resource allocation
  b. Search space
  c. CORESET
  d. Sequence configuration includes at least one of the following: time/frequency/spatial pattern, initialization value, base sequence, initialization value, scrambling sequence, scrambling method, root index, circular shift value, sequence length.

In some implementation, at least one of the reference signal and/or PDCCH may be transmitted periodically. The periodicity of the at least one of the reference signal and/or PDCCH is configurable. In some embodiment, the DRX cycle is greater than the periodicity of the at least one of the reference signal and/or PDCCH. In an example, the periodicity of the at least one of the reference signal and/or PDCCH divides the DRX cycle. In some embodiment, the DRX cycle is smaller than the periodicity of the at least one of the reference signal and/or PDCCH. In an example, the DRX cycle divides the periodicity of at least one of the reference signal and/or PDCCH. In some embodiment, the DRX cycle equals the periodicity of the at least one of the reference signal and/or PDCCH. In some embodiment, the at least one of the reference signal and/or PDCCH is transmitted when there is uplink or downlink transmission grant. In some embodiment, the at least one of the reference signal and/or PDCCH is transmitted when there will be uplink or downlink transmission grant after a time offset.

In some implementation, at least a plurality of reference signals and/or PDCCH and/or signaling may be transmitted periodically. In an example, the periodicity of a first plurality of reference signals and/or PDCCH and/or signaling is greater than the periodicity of a second plurality of reference signals and/or PDCCH and/or signaling. In an example, the periodicity of a first plurality of reference signals and/or PDCCH and/or signaling divides the periodicity of a second plurality of reference signals and/or PDCCH and/or signaling. In an example, the periodicity of a third plurality of reference signals and/or PDCCH and/or signaling is smaller than the DRX cycle. In an example, the periodicity of a third plurality of reference signals and/or PDCCH and/or signaling divides the DRX cycle. In an example, the periodicity of a third plurality of reference signals and/or PDCCH and/or signaling is greater than the DRX cycle. In an example, the DRX cycle divides the periodicity of a third plurality of reference signals and/or PDCCH and/or signaling. In an example, the periodicity of a fourth plurality of reference signals and/or PDCCH and/or signaling is greater than the short DRX cycle. In an example, short DRX cycle divides the periodicity of a fourth plurality of reference signals and/or PDCCH and/or signaling. In an example, the periodicity of a fourth plurality of reference signals and/or PDCCH and/or signaling is smaller than the short DRX cycle. In an example, the periodicity of a fourth plurality of reference signals and/or PDCCH and/or signaling divides the long DRX cycle.

In some implementation, at least part of the resource (such as time/frequency/code/spatial domain) of a plurality of the reference signals and/or PDCCH and/or signaling is the same. The plurality of the reference signals and/or PDCCH and/or signaling multiplex in other resource domain (such as time/frequency/code/spatial domain). In an example, at least part of the time of a plurality of the reference signals and/or PDCCH and/or signaling is the same. The plurality of the reference signals and/or PDCCH and/or signaling multiplex in other resource domain (such as frequency/code/spatial domain).

In some implementation, at least the first reference signal and/or PDCCH and/or signaling is transmitted periodically. In some implementation, at least the second and reference signal and/or PDCCH and/or signaling is triggered, enabled, or disabled by the first reference signal. In some implementation, at least the second reference signal and/or PDCCH and/or signaling is aperiodical.

In some embodiment, the reference signal and/or PDCCH and/or signaling could be interpreted as at least one of the following way:
  a. If the reference signal and/or PDCCH and/or signaling is transmitted or detected or received, the UE is expected to update its parameter;
  b. If the reference signal and/or PDCCH and/or signaling is transmitted or detected or received, drx-onDurationTimer or a DRX cycle would be started after a time offset;
  c. If the reference signal and/or PDCCH and/or signaling is transmitted or detected or received during DRX-off or Inactive Time, drx-onDurationTimer or a DRX cycle would be started after a time offset.
  d. If the reference signal and/or PDCCH and/or signaling is transmitted, detected, or received, it indicates for at least one of the PDCCH and/or signaling monitoring, RRM measurement, CSI measurement, synchronization, SSB reception after a time offset.
  e. If the reference signal and/or PDCCH is transmitted or detected or received, drx-onDurationTimer or a DRX cycle would be started;
  f. If the reference signal and/or PDCCH and/or signaling is transmitted or detected or received during DRX-off or Inactive Time, drx-onDurationTimer or a DRX cycle would be started.
  g. If the reference signal and/or PDCCH and/or signaling is transmitted, detected, or received, it indicates for at least one of the following: PDCCH and/or signaling monitoring, RRM measurement, CSI measurement, synchronization, SSB reception.
  h. If the reference signal and/or PDCCH and/or signaling is transmitted or detected or received, the UE is expected to update its parameter;
  i. If the reference signal and/or PDCCH and/or signaling is not transmitted, detected, or received, drx-onDurationTimer or a DRX cycle would be started after a time offset;
  j. If the reference signal and/or PDCCH and/or signaling is not transmitted, detected, or received during DRX-off or Inactive Time, drx-onDurationTimer or a DRX cycle would be started after a time offset.
  k. If the reference signal and/or PDCCH and/or signaling is not transmitted, detected, or received, it indicates for at least one of the PDCCH and/or signaling monitoring, RRM measurement, CSI measurement, synchronization, SSB reception after a time offset.
  l. If the reference signal and/or PDCCH and/or signaling is not transmitted or detected or received, drx-onDurationTimer or a DRX cycle would be started;
  m. If the reference signal and/or PDCCH and/or signaling is not transmitted or detected or received during DRX-off or Inactive Time, drx-onDurationTimer or a DRX cycle would be started.

n. If the reference signal and/or PDCCH and/or signaling is not transmitted, detected, or received, it indicates for at least one of the following: PDCCH and/or signaling monitoring, transmission feedback information, RRM measurement, CSI measurement, CSI acquisition, CSI report, synchronization, beam information, beam sweeping, SSB reception.
o. If information in the reference signal and/or PDCCH and/or signaling indicates whether drx-onDurationTimer or a DRX cycle would be started after a time offset or not;
p. If information in the reference signal and/or PDCCH and/or signaling during DRX-off or Inactive Time indicates whether drx-onDurationTimer or a DRX cycle would be started after a time offset or not;
q. If information in the reference signal and/or PDCCH and/or signaling indicates for at least one of the PDCCH and/or signaling monitoring, transmission feedback information, RRM measurement, CSI measurement, CSI acquisition, CSI report, synchronization, beam information, beam sweeping, SSB reception after a time offset;
r. If information in the reference signal and/or PDCCH and/or signaling indicates whether drx-onDurationTimer or a DRX cycle would be started or not;
s. If information in the reference signal and/or PDCCH and/or signaling during DRX-off or Inactive Time indicates whether drx-onDurationTimer or a DRX cycle would be started or not;
t. If information in the reference signal and/or PDCCH and/or signaling indicates for at least one of the following: transmission feedback information, PDCCH and/or signaling monitoring, RRM measurement, CSI measurement, CSI acquisition, CSI report, synchronization, beam information, beam sweeping, SSB reception;

In some embodiment, the offset is a non-negative value. In some embodiment, the offset is related to at least one of the following: drx-SlotOffset, BWP switching time, CSI computation time, slot offset for scheduling, PDSCH decoding time, a predefined non-negative value. In an example, the offset is not less than the sum of drx-SlotOffset and BWP switching time. In an example, the offset is not less than the BWP switching time. In an example, the offset a predefined non-negative value. In some embodiment, the time offset is related to UE capability.

In some embodiment, the parameter, parameter set, or parameter index set includes at least one of the following information:
a. the parameters in DRX configuration,
b. PDCCH and/or signaling monitoring parameters,
c. slot offset for scheduling related parameters.
d. Information for uplink or downlink transmission. Wherein the information could include at least one of the following: resource allocation for uplink or downlink transmission, one or more items that are same with at least one of the DCI formats: Format 0_0, Format 0_1, Format 1_0, Format 1_1, Format 2_0, Format 2_1, Format 2_2, Format 2_3.
e. A start of DRX cycle.
f. A start of at least one of the timer: drx-onDurationTimer, drx-InactivityTimer, drx-RetransmissionTimerDL, drx-RetransmissionTimerUL, ra-ContentionResolutionTimer.
g. A termination of DRX cycle.
h. A termination of at least one of the timer: drx-onDurationTimer, drx-InactivityTimer, drx-RetransmissionTimerDL, drx-RetransmissionTimerUL, ra-ContentionResolutionTimer
i. RRC state transition indication. Wherein the state includes at least RRC_Connected state, RRC_idle state, RRC_inactive state.
j. State transition indication, Wherein the state includes at least Active Time or Inactive Time;
k. DRX state transition indication, Wherein the DRX state includes at least one of DRX on-duration, DRX off-duration;
l. Wherein the PDCCH and/or signaling monitoring parameters includes at least one of search space and CORESET (control resource set), resource allocation.
m. Indication for at least one of the following: PDCCH and/or signaling monitoring, RRM measurement, CSI acquisition, beam information, beam sweeping, CSI report, CSI measurement, synchronization, SSB reception.

In some cases, the reference signal and/or PDCCH and/or signaling works as an "wake-up-signal" to make UE transfer from Inactive to Active. In some cases, the reference signal and/or PDCCH and/or signaling works as an "Go-to-sleep-signal" to make UE transfer from 'Active' to 'Inactive.'

When a DRX cycle is configured, the Active Time includes the time while:
a. drx-onDurationTimer or drx-InactivityTimer or drx-RetransmissionTimerDL or drx-RetransmissionTimerUL or ra-ContentionResolutionTimer is running; or
b. a Scheduling Request is sent on PUCCH and is pending; or
c. a PDCCH indicating a new transmission addressed to the C-RNTI of the MAC entity has not been received after successful reception of a Random Access Response for the Random Access Preamble not selected by the MAC entity among the contention-based Random Access Preamble.

Otherwise, it is an inactive time.

Drx-onDurationTimer, drx-SlotOffset, drx-InactivityTimer, drx-RetransmissionTimerDL or drx-RetransmissionTimerUL are included in DRX_config IE. Ra-ContentionResolutionTimer is included in RACH-ConfigCommon.

In some implementations, the information or parameter update information conveyed by the reference signal may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain.

In some implementations, at least a plurality of the reference signal is used for at least one of synchronization, or beam information or CSI acquisition or RRM measurement or CSI report or CSI measurement. In an example, at least a plurality of reference signal is used for at least one of synchronization or CSI acquisition or CSI report or CSI measurement or RRM measurement in FR1 (frequency range 1). In an example, a plurality of reference signal is at least one of CSI-RS for CSI acquisition, CSI-RS for tracking, or SS/PBCH (frequency range 1) block. In an example, a plurality of reference signal is used for at least one of beam information, synchronization, CSI acquisition, CSI report, CSI measurement or RRM measurement in FR2 (frequency range 2). In an example, a plurality of reference signal is at least one of CSI-RS for CSI acquisition or CSI-RS for tracking or SS/PBCH (frequency range 2) block.

In some implementation, the DCI used to indicate parameter update is at least one of DCI in DCI format 0-0, DCI format 0-1, DCI format 1-0, DCI format 1-1, DCI format 2-0, DCI format 2-1, DCI format 2-2, DCI format 2-3. In some implementation, the DCI used to indicate parameter update at least includes the DCI with minimum size in DCI format 0-0, DCI format 0-1. DCI format 1-0, DCI format 1-1, DCI format 2-0, DCI format 2-1, DCI format 2-2, DCI format 2-3. In some implementation, the size of the DCI used to indicate parameter update is not greater than the minimum size of any DCI in DCI format 0-0, DCI format 0-1, DCI format 1-0, DCI format 1-1. DCI format 2-0, DCI format 2-1, DCI format 2-2, DCI format 2-3. In some implementation, the size of the DCI used to indicate parameter update is not greater than the minimum size of one of the DCI used to indicate parameter update in DCI format 0-0, DCI format 0-1, DCI format 1-0, DCI format 1-1, DCI format 2-0, DCI format 2-1, DCI format 2-2, DCI format 2-3. In some implementation, the DCI used to indicate parameter update is DCI format 0-0 or DCI format 1-0. The DCI used to indicate parameter update is used at least for power saving purpose or other functionalities supported in Release 16.

Scheme 2-2

In this scheme, the network sends a message to the UE through a reference signal or PDCCH to inform the parameter update. In some implementation, the reference signal and/or PDCCH may be transmitted periodically. The periodicity of the reference signal and/or PDCCH is configurable. In some embodiment, the DRX cycle is greater than the periodicity of the reference signal and/or PDCCH. In an example, the periodicity of the reference signal and/or PDCCH divides the DRX cycle. In some embodiment, the DRX cycle is smaller than the periodicity of the reference signal and/or PDCCH. In an example, the DRX cycle divides the periodicity of the reference signal and/or PDCCH. In some embodiment, the DRX cycle equals the periodicity of the reference signal and/or PDCCH. In some embodiment, the reference signal and/or PDCCH is transmitted when there is uplink or downlink transmission grant. In some embodiment, the reference signal and/or PDCCH is transmitted when there will be uplink or downlink transmission grant after a time offset. In an example, short DRX cycle divides the periodicity of the reference signal and/or PDCCH. In an example, the periodicity of the reference signals and/or PDCCH divides the long DRX cycle.

Scheme 2-3

In this scheme, the network sends a first signaling to UE to indicate information of a second signaling and/or a third signaling. At least one of the second signaling, or the third signaling is sent by network to indicate the parameter update. The first and/or second signaling and/or the third signaling may be at least sent through a reference signal or PDCCH.

In some implementation, the network sends a first reference signal to UE to indicate information of a second reference signal. The second reference signal is sent by network to indicate the parameter update. In some implementation, the first reference signal and/or second reference signal may include at least one of the following: CSI-RS, SS, PT-RS, or SS/PBCH block. In some implementation, the first and/or second reference signal is used for at least one of the following: RRM measurement, CSI measurement, CSI acquisition, CSI report, synchronization, beam information, beam sweeping. SSB reception. In some implementation, the first reference signal and second reference signal may be CSI-RS with different configurations. In an example, the first and/or second reference signals may be one of the following: CSI-RS for CSI acquisition, CSI-RS for L1 RSRP computation, or CSI-RS for tracking. None of the parameters, CSI-RS-ResourceRep, TRS-Info, or CSI-RSResource-Mobility, is configured for CSI-RS for CSI acquisition. The parameter CSI-RS-ResourceRep is configured but none of parameter TRS-Info and parameter CSI-RSResource-Mobility is configured for CSI-RS for L1 RSRP. The parameter TRS-Info is configured, but none of parameter CSI-RS-ResourceRep and parameter CSI-RSResource-Mobility is configured for CSI-RS for tracking.

In some implementation, at least the first signaling is transmitted periodically. In some embodiment, at least one of the first, second or third signaling is transmitted periodically. In some embodiment, the periodicity of the first signaling is smaller than the periodicity of the second and/or the third signaling. In some embodiment, the periodicity of the first signaling divides the periodicity of the second and/or the third signaling.

In some implementation, the information conveyed by the first signaling indicates at least the existence of the second and/or the third signaling. In some implementation, the information conveyed by the first signaling triggers, enables, or disables the second and/or the third signaling. If first signaling is received, the UE would be expected to receive, enable, or disable the second and/or the third signaling. In some implementation, if the UE is configured with DRX, at least one of the first to third signaling is transmitted during the DRX-off or Inactive Time. In some implementation, if the UE is configured with DRX, at least one of the first, the second, the third signaling is transmitted/received a time offset before the drx-onDurationTimer or a DRX cycle starts. In some implementation, if the UE is configured with DRX, the first signaling is transmitted/received a time offset before the drx-onDurationTimer or a DRX cycle starts. In some implementation, if the UE is configured with DRX and there will be DL or UL data transmission, at least one of the first, the second, the third signaling is transmitted/received a time offset before the drx-onDurationTimer or a DRX cycle starts. In some implementation, if the UE is configured with DRX and there will be DL or UL data transmission, the first signaling is transmitted/received a time offset before the drx-onDurationTimer or a DRX cycle starts. The second and/or the third singling may be triggered, enabled, or disabled by the first signaling, or configured by higher layer parameter (such as RRC signaling or MAC CR).

In some implementation, the second and/or the third signaling may be used for at least one of synchronization, beam information, CSI acquisition, or CSI measurement, or CSI report, or RRM measurement. In some embodiment, the second signaling and/or the third is at least one of CSI-RS for CSI acquisition or CSI-RS for tracking or SS/PBCH block. In an example, the second and/or the third signaling is at least one of CSI-RS for CSI acquisition, CSI-RS for tracking, or SS/PBCH (frequency range 1) block. In an example, the second and/or the third signaling is at least one of CSI-RS for CSI acquisition, CSI-RS for tracking, or SS/PBCH (frequency range 1) block. The second and/or the third singling may be triggered, enabled, or disabled by the first signaling, or configured by higher layer parameter (such as RRC signaling or MAC CR).

In some implementation, the second signaling may be transmitted within a BWP that is different from the one for the reception of the first signaling. In some implementation, the second signaling may be transmitted within a BWP that is different from the previous active BWP. In some implementation, the second signaling may be transmitted within a BWP that is not the initial BWP or default BWP. In some implementation, the second signaling may be transmitted with a BWP that is used for the UL or DL transmission grant. In some implementation, the second signaling may be transmitted with a BWP that is used for the UL or DL data transmission. In some embodiment, the third signaling may include the BWP switching indication.

In some implementation, the second signaling may be transmitted within a carrier that is different from the one for the reception of the first signaling/Pcell. In some implementation, the second signaling may be transmitted within a carrier that is different from the previous active carrier/Pcell. In some implementation, the second signaling may be transmitted with a carrier that is used for the UL or DL transmission grant. In some embodiment, the third signaling may include the carrier activation indication. In some implementation, the first signaling may be transmitted within the Pcell. In an example, the Scell may be activated or de-activated by a timer.

In some implementation, the third signaling may be used for indication of the UE parameter configuration or parameter update.

In some embodiment, the first and second signaling are reference signal, the third signaling is PDCCH. In some embodiment, the first, second and third signaling are reference signals.

In some embodiment, the first and/or the second signaling can be used at least for CSI acquisition, beam information, beam sweeping, CSI report, CSI measurement, synchronization, SSB reception, or RRM measurement. In an example, the first reference signal is used for synchronization or beam information or RRM measurement. In an example, the first reference signal is used for synchronization or RRM measurement in FR1 (frequency range 1). In an example, the first reference signal is used for beam information or RRM measurement in FR2 (frequency range 2). In an example, the first reference signal is CSI-RS for tracking or SS or SS/PBCH block. In an example, the second reference signal is used for CSI acquisition, CSI report, CSI measurement, or RRM measurement. In an example, the second reference signal is CSI-RS for CSI acquisition, or SS or SS/PBCH block. In some embodiment, the first and second signaling can be CSI-RS with different configurations.

In some implementation, the first signaling is a DCI, the second signaling is a reference signal. In some implementation, the reference signal may include at least CSI-RS, SS, SS/PBCH block, or PT-RS. In some implementation, the reference signal can be used at least for CSI acquisition, beam information, beam sweeping, CSI report, CSI measurement, synchronization, SSB reception, or RRM measurement. In an example, the reference signal may include one of the CSI-RS for CSI acquisition, CSI-RS for L1 RSRP computation, or CSI-RS for tracking.

In some implementation, the first signaling is a reference signal, the second signaling is a DCI. The DCI is sent by network to indicate the parameter update. In some implementation, the reference signal may include CSI-RS, SS, SS/PBCH block, or PT-RS. In some implementation, the reference signal can be used at least for CSI acquisition, beam information, beam sweeping, CSI report, CSI measurement, synchronization, SSB reception, or RRM measurement. In an example, the reference signal could may include one of the CSI-RS for CSI acquisition, CSI-RS for L1 RSRP computation, or CSI-RS for tracking. In some implementation, the size of the DCI is not greater than the minimum size of any DCI in DCI 0-0, DCI 0-1, DCI 1-0, DCI 1-1, DCI 2-0, DCI 2-1, DCI 2-2, DCI 2-3. In some implementation, the size of the DCI is not greater than the minimum size of one of the DCI in DCI 0-0, DCI 0-1, DCI 1-0, DCI 1-1, DCI 2-0, DCI 2-1, DCI 2-2, DCI 2-3. In some implementation, the DCI is DCI 0-0 or DCI 1-0.

In some implementation, the first and second signaling are DCI. The second DCI is sent by network to indicate the parameter update. In some implementation, the size of the first DCI and/or second DCI is not greater than the minimum size of any DCI in DCI 0-0, DCI 0-1, DCI 1-0, DCI 1-1, DCI 2-0, DCI 2-1, DCI 2-2, DCI 2-3. In some implementation, the size of the first DCI and/or second DCI is not greater than the minimum size of one of the DCI in DCI 0-0, DCI 0-1, DCI 1-0, DCI 1-1, DCI 2-0, DCI 2-1, DCI 2-2, DCI 2-3. In some implementation, the first DCI and/or second DCI is DCI 0-0 or DCI 1-0.

In some implementation, the information conveyed by the first signaling could trigger, enable, or disable a second and/or a third signaling. The second and/or the third signaling could trigger, enable, or disable a fourth signaling.

In some embodiment, the first and/or the second signaling is a reference signal. The third and/or the fourth signaling is a DCI. In some embodiment, the information in the third and/or the fourth signaling includes at least one of the parameter update indication or parameter update inquiry or parameter set or parameter index.

In some embodiment, the information in the fourth signaling includes at least one of the parameter update indication or parameter update inquiry or parameter set or parameter index for DL transmission or UL transmission.

In some embodiment, the information in the third signaling includes at least one of the parameter update indication or parameter update inquiry or parameter set or parameter index for UL transmission or DL transmission.

In some implementation, at least the first signaling is transmitted periodically. In some embodiment, at least one of the first, second, third or fourth signaling is transmitted periodically. In some embodiment, the periodicity of the first signaling is smaller than the periodicity of the second and/or the third signaling. In some embodiment, the periodicity of the first signaling divides the periodicity of the second and/or the third signaling. In some embodiment, the periodicity of the fourth signaling is smaller than the periodicity of the second and/or the third signaling. In some embodiment, the periodicity of the fourth signaling divides the periodicity of the second and/or the third signaling.

Scheme 3

Figure 5:
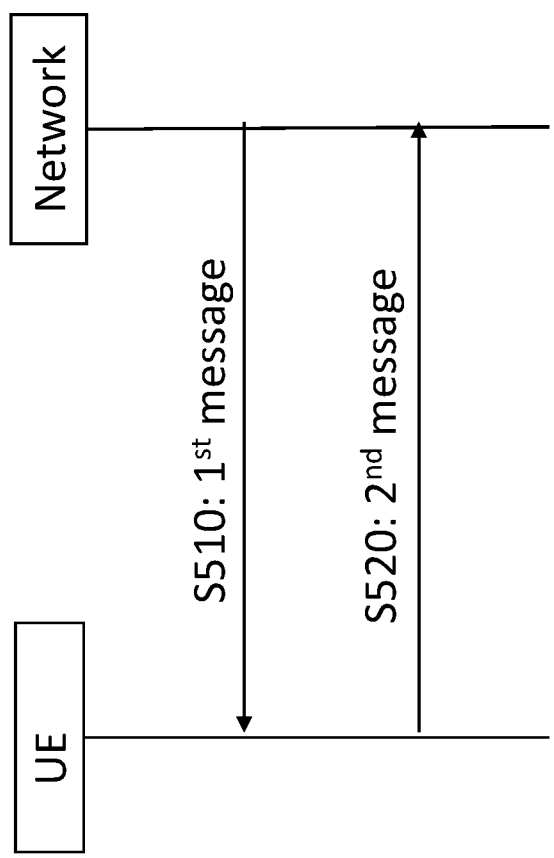
FIG. 5 shows an example of an adaptive parameter configuration method of the disclosed technology.

In this scheme, the network provides the configuration parameters to the UE, and the UE reports its decision to the network. FIG. 5 shows an example of a process based on Scheme 3.

At 510, a first message is sent by the network to the UE. In some implementations, the first message may convey at least one of a parameter update indication, a parameter update inquiry, a first parameter set, or a first parameter index set. The first parameter set may include one or more first parameters that are considered by the UE as candidate parameters for configuration parameters. The first parameter index set may include indexes that indicate one or more first parameters that are considered by the UE as candidate parameters for configuring the UE. In some implementations, the first parameter set or one or more first parameters may be a subset of a first parameter table. The first parameter table may be stored in the network and UE. In some implementations, the first parameter set may include one parameter with different values. In some implementations, the first message may be transmitted through at least one of the following way: (a) a higher layer signaling, such as RRC signaling or MAC CE. (b) a Layer 1 signaling sent through PDCCH or PDSCH, or (c) a reference signal such as CSI-RS or SS or SS/PBCH block, or PT-RS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain.

In some implementations, the information conveyed by the reference signal may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain.

In some implementation, the DCI used to indicate parameter update is at least one of DCI in DCI format 0-0, DCI format 0-1, DCI format 1-0, DCI format 1-1, DCI format 2-0, DCI format 2-1. DCI format 2-2, DCI format 2-3. In some implementation, the DCI used to indicate parameter update at least includes the DCI with minimum size in DCI format 0-0, DCI format 0-1, DCI format 1-0, DCI format 1-1, DCI format 2-0, DCI format 2-1, DCI format 2-2, DCI format 2-3. In some implementation, the size of the DCI used to indicate parameter update is not greater than the minimum size of any DCI in DCI format 0-0, DCI format 0-1, DCI format 1-0, DCI format 1-1, DCI format 2-0, DCI format 2-1, DCI format 2-2, DCI format 2-3. In some implementation, the size of the DCI used to indicate parameter update is not greater than the minimum size of one of the DCI used to indicate parameter update in DCI format 0-0, DCI format 0-1, DCI format 1-0, DCI format 1-1, DCI format 2-0, DCI format 2-1, DCI format 2-2, DCI format 2-3. In some implementation, the DCI used to indicate parameter update is DCI format 0-0 or DCI format 1-0. The DCI used to indicate parameter update is used at least for power saving purpose or other functionalities supported in Release 16.

At 520, a second message is sent from the UE to the network. The second message is used to indicate its updated configuration. In some implementations, the second message may convey at least a second parameter set, a parameter update indication, or a second parameter index set. In some implementations, the second parameter set or the second parameter index set may be a subset of the first parameter set or the first parameter index set. In some implementations, the second parameter set or one or more second parameters indicated in the second parameter index set may be a subset of a second parameter table. In some implementations, the second parameter table is a subset of the first parameter table. In some implementations, the first parameter table is a subset of the second parameter table. In some implementations, a partial part of the first parameter table is a subset of the second parameter table.

In some implementations, the second message may be at least one of the following: a higher layer parameter such as RRC signaling, MAC CE, PUCCH, PUSCH, or a reference signal. In an example, the reference signal may include SRS or PT-RS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain.

In some implementation, the information conveyed in the first and/or second message is determined with a priority or predefined order. In some implementation, within the priority or predefined order, at least one of the following parameters have highest priorities: slot offset for scheduling, some or all parameters in SearchSpace IE, drx-InactivityTimer in DRX-Config IE. In some implementations, information included in the first message is a bitmap indicating the first parameter table. In some implementations, information included in the second message is a bitmap indicating the second parameter table. In some implementations, information included in the second is a bitmap indicating the information in the first message.

In some implementation, the number of bits of information indicated in the second message is determined by the information in the first message. In some implementation, the number of bits of information indicated in the second message is determined by the maximum number of parameter sets or parameter index sets which can be supported by the first message. In some implementation, the information conveyed in second message may be interpreted based on information indicated in the first message. The information indicated in the first message may be varied and then the information in the second message may have different indications. For example, when the first message conveys information, [parameter1, parameter2], the second message may convey "0" in response to the first message. In this case, information "0" conveyed in the second message may be interpreted that the UE needs to use parameter1. For other cases that the second message does not include "0", the UE is configured with parameter2. When the first message conveys information, [parameter3, parameter4] and the second message conveys "0," information "0" conveyed in the second message may be interpreted that the UE needs to use parameter3. For other cases that the second message does not include "0," the UE is configured with parameter4.

In some implementation, the first message may be a higher layer message such as RRC signaling or MAC CE. The first message sent by the network indicates sets of parameters. The second message, such as PUSCH or PUCCH or reference signal, is sent by UE to indicate the updated parameters.

In some implementation, the first message may be sent through PDCCH or PDSCH or reference signal. The first message sent by the network indicates sets of parameters. The second message, such as PUCCH or PUSCH or reference signal, is sent by the UE to indicate the updated parameters.

In some implementation, the information included in first or second the message would be invalid or de-activated if a timer is expired or a higher layer parameter or a L1 signaling is transmitted or received.

Scheme 4

In this scheme, the UE sends a message to the network to indicate its updated configuration. The message may include a parameter set, parameter index set, parameter update indication. In some implementations, the parameter set or one or more parameters indicated in the message may be a subset of a parameter table. The parameter table may be stored in the UE and network. In some implementations, the message may be transmitted through at least one of the following signaling (a) a higher layer signaling, such as RRC signaling or MAC CE, (b) a Layer 1 signaling sent through PUCCH or PUSCH, or (c) a reference signal. The reference signal may include PT-RS or SRS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain. In some implementations, the information conveyed by the reference signal may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain.

In some implementations, information included in the message is a bitmap indicating the parameter table.

In some implementation, the UCI used to indicate parameter update is at least one of UCI in UCI format 0, UCI format 1, UCI format 2, UCI format 3, UCI format 4. In some implementation, the UCI used to indicate parameter update at least includes the UCI with minimum size in UCI in UCI format 0, UCI format 1, UCI format 2, UCI format 3, UCI format 4. In some implementation, the size of the UCI used to indicate parameter update is not greater than the minimum size of any UCI in UCI in UCI format 0, UCI format 1, UCI format 2, UCI format 3, UCI format 4. In some implementation, the size of the UCI used to indicate parameter update is not greater than the minimum size of one of the UCI used to indicate parameter update in UCI format 0, UCI format 1, UCI format 2, UCI format 3, UCI format 4. In some implementation, the UCI used to indicate parameter update is UCI in UCI format 0, UCI format 1, UCI format 2.

In some implementation, the information included in the message would be invalid or de-activated if a timer is expired or a higher layer parameter or a L1 signaling is transmitted or received.

Scheme 5

Figure 6:
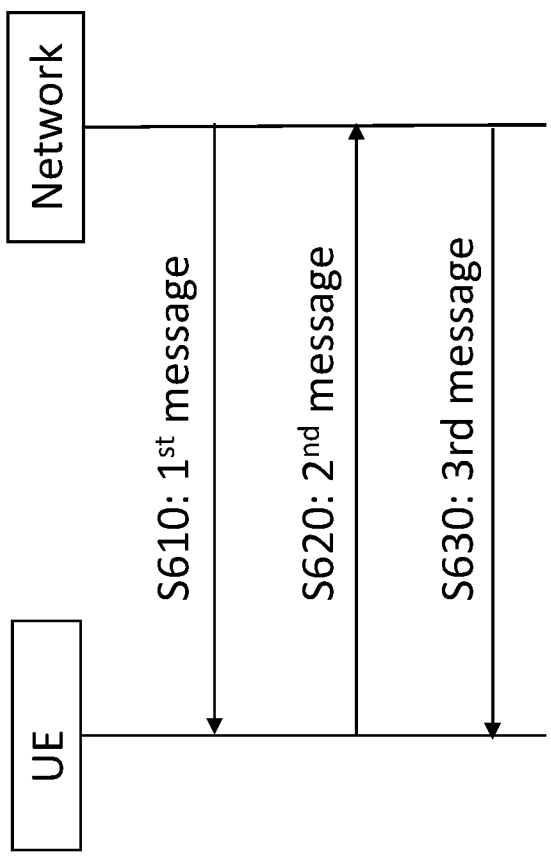
FIG. 6 shows an example of an adaptive parameter configuration method of the disclosed technology.

FIG. 6 shows an example of a configuration process based on Scheme 5. In this scheme, the network informs the parameter update to the UE. In response to the parameter update indication from the network, the UE reports the configuration parameters to the network and the network makes the decision and indicates its decision to the UE.

At 610, a first message is sent by the network to inform the parameter update. The first message may include a parameter update indicator. The first message may be transmitted through (a) a higher layer signaling, such as RRC signaling or MAC CE, (b) a Layer 1 signaling sent through PDCCH or PDSCH; or (c) a reference signal. The reference signal may include CSI-RS, PT-RS, SS or SS/PBCH block. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain.

In some implementation, the DCI used to indicate parameter update is at least one of DCI in DCI format 0-0, DCI format 0-1, DCI format 1-0, DCI format 1-1, DCI format 2-0, DCI format 2-1, DCI format 2-2, DCI format 2-3. In some implementation, the DCI used to indicate parameter update at least includes the DCI with minimum size in DCI format 0-0, DCI format 0-1. DCI format 1-0, DCI format 1-1, DCI format 2-0, DCI format 2-1, DCI format 2-2, DCI format 2-3. In some implementation, the size of the DCI used to indicate parameter update is not greater than the minimum size of any DCI in DCI format 0-0, DCI format 0-1, DCI format 1-0, DCI format 1-1, DCI format 2-0, DCI format 2-1, DCI format 2-2, DCI format 2-3. In some implementation, the size of the DCI used to indicate parameter update is not greater than the minimum size of one of the DCI used to indicate parameter update in DCI format 0-0, DCI format 0-1, DCI format 1-0, DCI format 1-1, DCI format 2-0, DCI format 2-1, DCI format 2-2, DCI format 2-3. In some implementation, the DCI used to indicate parameter update is DCI format 0-0 or DCI format 1-0. The DCI used to indicate parameter update is used at least for power saving purpose or other functionalities supported in Release 16.

At 620, a second message is sent by UE to the network. In some implementations, the second message may include a first parameter set or a first parameter index set. The first parameter set may include one or more first parameters that are considered by the network as candidate parameters for configuring the UE. The first parameter index set may include indexes that indicate one or more first parameters that are considered by the network as candidate parameters for configuring the UE. In some implementations, the first parameter set or one or more first parameters may be a subset of a first parameter table. The first parameter table may be stored in the UE and network. In some implementations, the first parameter set may include one parameter with different values. In some implementations, the first message may be transmitted through at least one of the following way (a) a higher layer signaling, such as RRC signaling or MAC CE. (b) a Layer 1 signaling such as PUCCH or PUSCH, or (c) a reference signal. The reference signal could be SRS or PR-RS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain.

In some implementations, the information conveyed by the reference signal may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain.

At 630, a third message is sent by the network to the UE. The third message may convey a second parameter set, a parameter update indication, or a second parameter index set. In some implementations, the second parameter set or one or more second parameters indicated in the second parameter index set may be a subset of the first parameter set or the first parameter. In some implementations, the second parameter set or the one or more second parameters may be a subset of a second parameter table. In some implementations, the second parameter table is a subset of the first parameter table. In some implementations, the first parameter table is a subset of the second parameter table. In some implementations, a partial part of the first parameter table is a subset of the second parameter table. The third message may be a higher layer message such as RRC signaling, MAC CE, DCI, or a reference signal. In some implementation, the reference signal may include CSI-RS, SS, SS/PBCH block, or PT-RS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain.

In some implementation, the information conveyed in the second and/or third message is determined with a priority or predefined order. In some implementation, within the priority or predefined order, at least one of the following parameters have highest priorities: slot offset for scheduling, some or all parameters in SearchSpace IE, drx-InactivityTimer in DRX-Config IE.

In some implementations, information included in the second message is a bitmap indicating the first parameter table. In some implementations, information included in the third message is a bitmap indicating the second parameter table. In some implementations, information included in the second is a bitmap indicating the information in the second message.

In some implementation, the number of bits of information indicated in the second message is determined based on the information in the second message. In some implementation, the number of bits of information indicated in the second message is determined based on the maximum number of parameter sets or parameter index sets which can be supported by the second message. In some implementation, the information conveyed in the third message may be interpreted based on information indicated in the second message. The information indicated in the second message may be varied and then the information in the third message may have different indications. For example, when the second message conveys information, [parameter1, parameter2], the third message may convey "0" in response to the second message. In this case, information "0" conveyed in the third message may be interpreted that the UE needs to use parameter1 in its configuration. For other cases that the third message does not include "0", the UE is configured with parameter2. When the second message conveys information, [parameter3, parameter4] and the third message conveys "0," information "0" conveyed in the third message may be interpreted that the UE needs to use parameter3 in its configuration. For other cases that the third message does not include "0." the UE is configured with parameter4.

In some implementation, the second message may be a higher layer message such as RRC signaling or MAC CE. The third message sent by the UE indicates sets of parameters. The second message, such as DCI or reference signal, is sent by the network to indicate the parameters to be used for configuring the UE.

In some implementation, the second message may be sent through PUCCH or PUSCH or reference signal. The second message sent by the UE indicates one or more sets of parameters. The third message, such as DCI or reference signal, is sent by the network to indicate the parameters to be used for configuring the UE.

In some implementation, the information included in the message would be invalid or de-activated if a timer is expired or a higher layer parameter or a L1 signaling is transmitted or received.

Scheme 6

Figure 7:
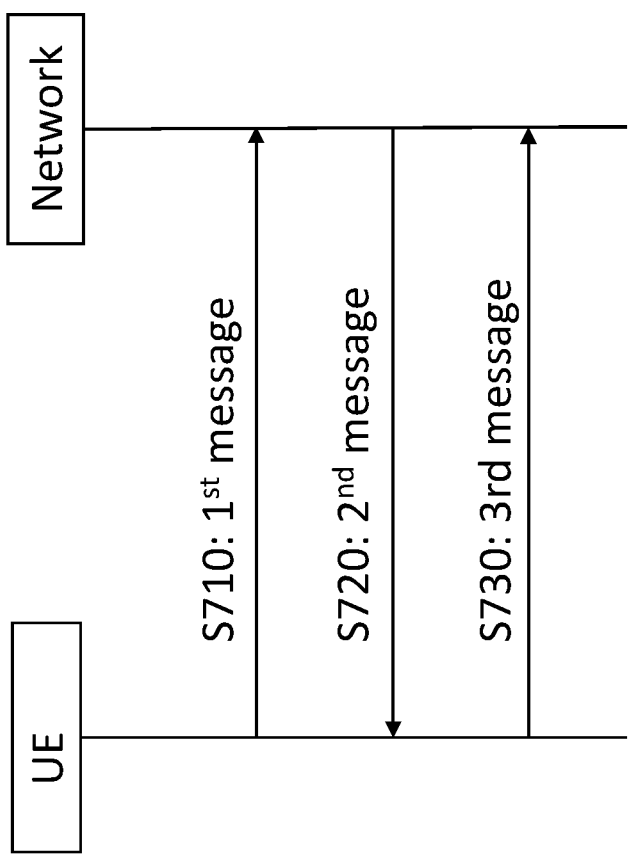
FIG. 7 shows an example of an adaptive parameter configuration method of the disclosed technology.

FIG. 7 shows an example of a configuration process based on Scheme 6. In this scheme, the UE sends a first message including a parameter update inquiry to the network. In response to the parameter update inquiry from the UE, the network gives a suggestion for the configuration parameters to the UE and the UE makes the decision and reports its decision to the network.

At 710, a first message is sent by the UE to inquiry a parameter update. The first message may include a parameter update inquiry and be transmitted through (a) a higher layer signaling, such as RRC signaling or MAC CE, (b) a Layer 1 signaling sent through PUCCH or PUSCH; or (c) a reference signal. The reference signal may be as SRS or PT-RS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain. In some implementations, the information conveyed by the reference signal may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain. In some implementation, the format of the UCI is format 0 or format 1.

At 720, a second message is sent by network to the UE. In some implementations, the second message may include a first parameter set or a first parameter index set. The first parameter set may include parameters that are considered by the UE as candidate parameters for configuring the UE. The first parameter index set may include indexes that indicate one or more first parameters that are considered by the UE as candidate parameters for configuring the UE. In some implementations, the first parameter set or one or more first parameters may be a subset of a first parameter table. The first parameter table may be stored in the network and UE. In some implementations, the first parameter set may include one parameter with different values. In some implementations, the first message may be transmitted through at least one of the following way (a) a higher layer signaling, such as RRC signaling or MAC CE, (b) a Layer 1 signaling such as PDCCH or PDSCH, or (c) a reference signal. The reference signal may include CSI-RS, SS, SS/PBCH block, or PT-RS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS. PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain. In some implementations, the information conveyed by the reference signal may be differentiated by at least one of the following way: CDM (code domain multiplexing), TDM (time domain multiplexing), FDM (frequency domain multiplexing), SDM (spatial domain multiplexing), generation sequence, base sequence, initialization value, scrambling sequence, scrambling method, root index, circular shift value, sequence length, pattern in time/frequency/spatial domain.

At 730, a third message is sent from the UE to the network to report its updated configuration. The third message may convey a second parameter, a parameter update indication, or a second parameter index set. In some implementations, the second parameter set or the second parameter index set may be a subset of the first parameter set or the first parameter index set. In some implementations, the second parameter set or one or more second parameters indicated in the second parameter index set may be a subset of a second parameter table. In some implementations, the second parameter table is a subset of the first parameter table. In some implementations, the first parameter table is a subset of the second parameter table. In some implementations, a partial part of the first parameter table is a subset of the second parameter table. The third message may be a higher layer message such as RRC signaling, MAC CE, UCI, or a reference signal. In some implementation, the reference signal may include SRS or PT-RS. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain.

In some implementation, the information conveyed in the second and/or third message is determined with a priority or predefined order. In some implementation, within the priority or predefined order, at least one of the following parameters have highest priorities: slot offset for scheduling, some or all parameters in SearchSpace IE, drx-InactivityTimer in DRX-Config IE.

In some implementations, information included in the second message is a bitmap indicating the first parameter table. In some implementations, information included in the third message is a bitmap indicating the second parameter table. In some implementations, information included in the second is a bitmap indicating the information in the second message.

In some implementation, the number of bits of information indicated in the second message is determined by the information in the second message. In some implementation, the number of bits of information indicated in the second message is determined by the maximum number of parameter sets or parameter index sets which can be supported by the second message. In some implementation, the information conveyed in the third message may be interpreted based on information indicated in the second message. The information indicated in the second message may be varied and then the information in the third message may have different indications. For example, when the second message conveys information, [parameter1, parameter2], the third message may convey "0" in response to the second message. In this case, information "0" conveyed in the third message may be interpreted that the UE needs to use parameter1 in its configuration. For other cases that the third message does not include "0", the UE is configured with parameter2. When the second message conveys information, [parameter3, parameter4] and the third message conveys "0," information "0" conveyed in the third message may be interpreted that the UE needs to use parameter3 in its configuration. For other cases that the third message does not include "0," the UE is configured with parameter4.

In some implementation, the second message may be a higher layer message such as RRC signaling or MAC CE. The second message sent by the network indicates sets of parameters. The third message, such as PUSCH or PUCCH or reference signal, is sent by UE to indicate the updated parameters.

In some implementation, the second message may be sent through PDCCH or PDSCH or reference signal. The second message sent by the network indicates sets of parameters. The third message, such as PUCCH or PUSCH or reference signal, is sent by the UE to indicate the updated parameters.

In some implementation, the information included in first or second the message would be invalid or de-activated if a timer is expired or a higher layer parameter or a L1 signaling is transmitted or received.

Various implementations have been discussed based on Scheme 1 to 6 above. Schemes 1 to 6 above are examples of the disclosed technology and the disclosed technology may not be limited to Schemes 1 to 6. The technology could be a combination of at least two of Schemes 1 to 6. The technology could be a combination of part descriptions at least in Schemes 1 to 6. In some implementations, the network or UE may decide the configured parameters with a predefined priority, order, or dropping rule.

In the disclosed technology, the communication between the UE and the network may convey the information related at least one of the following parameters including items (1) to (7) as discussed below. In some implementations, the first and/or the second parameter table is a subset of the power saving parameter table. In some implementations, the first and/or the second parameter table is the power saving parameter table. In some implementations, the power saving parameter table may at least include at least one of the following parameters, or the following parameters may comprise a power saving parameter table, and the first and/or second parameter table mentioned above may be a sub-set of the power saving parameter table.

(1) Time resource allocation parameter. The time resource allocation parameter may include information related to at least one of the following: slot offset for scheduling, the number of scheduled slots, the number of scheduled transport blocks, or slot aggregation factor.

In some implementations, the slot offset related information includes at least one of the following:

K0 in the IE PDSCH-TimeDomainResourceAllocation or K2 in the IE PUSCH-TimeDomainResourceAllocation or the PDSCH-TimeDomainResourceAllocation in IE PDSCH-TimeDomainResourceAllocationList or the PUSCH-TimeDomainResourceAllocation in IE PUSCH-TimeDomainResourceAllocationList, or K0 in PDSCH-TimeDomainResourceAllocationlist or K2 in PUSCH-TimeDomainResourceAllocationlist or IE dl-DataToUL-ACK in PUCCH-Config or K1.

K0 is the slot offset between the scheduled PDSCH and DCI, K2 is the slot offset between the scheduled PUSCH and DCI, and K1 is the slot offset between the PDSCH and the corresponding acknowledge information. The IE PDSCH-TimeDomainResourceAllocation is used to configure a time domain relation between PDCCH and PDSCH. K0 is one of the parameters it included. The PDSCH-TimeDomainResourceAllocationList may contain one or more of such PDSCH-TimeDomainResourceAllocations. If K0 or K2 is greater than 0, it is not necessary for UE to buffer PDSCH or prepare PUSCH transmission when receiving PDCCH, which is more power efficient. With a proper value of K1, UE may decode PDSCH within a more relaxed time requirement, which is also power efficient.

An example of the slot offset for slot scheduling for power saving is that all the values of k0 in 'PDSCH-TimeDomainResourceAllocationList' in the power saving parameter table are greater than 0. Another example of slot offset for slot scheduling for power saving, the non-zero values of k0 in 'PDSCH-TimeDomainResourceAllocationList' in the power saving parameter table is provided.

An example of the slot offset for slot scheduling for power saving is that all the values of k0 in 'PDSCH-TimeDomainResourceAllocationList' in the parameter table are greater than 0. Another example of slot offset for slot scheduling for power saving, the non-zero values of k0 in 'PDSCH-TimeDomainResourceAllocationList' in the parameter table is provided.

An example of the slot offset for slot scheduling for power saving is that all the values of k0 in 'PDSCH-TimeDomainResourceAllocationList' in indicated in the message are greater than 0. Another example of slot offset for slot scheduling for power saving, the non-zero values of k0 in 'PDSCH-TimeDomainResourceAllocationList' indicated in the message is provided.

For DCI format 1_0, the PDSCH-to-HARQ-timing-indicator field values map to {1, 2, 3, 4, 5, 6, 7, 8}. For DCI format 1_1, the PDSCH-to-HARQ-timing-indicator field values map to values for a set of number of slots provided by higher layer parameter dl-DataToUL-ACK of 'PUCCH-Config' as defined in Table 1. The dl-DataToUL-ACK contains at least one or maximum 8 values from the set {0, 1, 2, 3, 4, . . . , 15}.

TABLE 1

Mapping of PDSCH-to-HARQ_feedback timing indicator field values to numbers of slots

| PDSCH-to-HARQ_feedback timing indicator | | | |
|---|---|---|---|
| 1 bit | 2 bits | 3 bits | Number of slots $k$ |
| '0' | '00' | '000' | $1^{st}$ value provided by dl-DataToUL-ACK |
| '1' | '01' | '001' | $2^{nd}$ value provided by dl-DataToUL-ACK |
| | '10' | '010' | $3^{rd}$ value provided by dl-DataToUL-ACK |
| | '11' | '011' | $4^{th}$ value provided by dl-DataToUL-ACK |
| | | '100' | $5^{th}$ value provided by dl-DataToUL-ACK |
| | | '101' | $6^{th}$ value provided by dl-DataToUL-ACK |
| | | '110' | $7^{th}$ value provided by dl-DataToUL-ACK |
| | | '111' | $8^{th}$ value provided by dl-DataToUL-ACK |

For DCI format 1_0, the PDSCH-to-HARQ-timing-indicator field values map to {1, 2, 3, 4, 5, 6, 7, 8}. For DCI format 1_1, the PDSCH-to-HARQ-timing-indicator field values map to values for a set of number of slots provided by higher layer parameter dl-DataToUL-ACK of 'PUCCH-Config' as defined in Table 2. The dl-DataToUL-ACK contains at least one or maximum 8 values from the set {0, 1, 2, 3, 4, . . . , 15}.

TABLE 2

Mapping of PDSCH-to-HARQ_feedback timing indicator field values to numbers of slots

| PDSCH-to-HARQ_feedback timing indicator | | | |
|---|---|---|---|
| 1 bit | 2 bits | 3 bits | Number of slots $k$ |
| '0' | '00' | '000' | $1^{st}$ value provided by dl-DataToUL-ACK |
| '1' | '01' | '001' | $2^{nd}$ value provided by dl-DataToUL-ACK |
| | '10' | '010' | $3^{rd}$ value provided by dl-DataToUL-ACK |
| | '11' | '011' | $4^{th}$ value provided by dl-DataToUL-ACK |
| | | '100' | $5^{th}$ value provided by dl-DataToUL-ACK |
| | | '101' | $6^{th}$ value provided by dl-DataToUL-ACK |
| | | '110' | $7^{th}$ value provided by dl-DataToUL-ACK |
| | | '111' | $8^{th}$ value provided by dl-DataToUL-ACK |

For example, it could be that (1) the values in dl-DataToUL-ACK in the power saving parameter table are larger than 0; (2) dl-DataToUL-ACK is equal to {2,4,6,8}.

For example, it could be that (1) the values in dl-DataToUL-ACK in the parameter table are larger than 0; (2) dl-DataToUL-ACK is equal to {2,4,6,8}.

For example, it could be that (1) the values in dl-DataToUL-ACK indicated by the message are larger than 0; (2) dl-DataToUL-ACK is equal to {2,4,6,8}.

In some implementations, the number of scheduled slot related information includes at least one of the following: the number of scheduled downlink slot n0, the number of scheduled uplink slot n2, the list of the number of scheduled downlink slot, the list of number of scheduled uplink slot.

In some implementations, the n1 slots may be consecutive or some of them are consecutive. In some implementations, the n2 slots may be consecutive or some of them are consecutive in time domain.

In some implementations, the number of scheduled uplink/downlink slots n1 or n2 indicates that the resource allocation in time, frequency, or spatial domain of (no more than) n1 or n2 slots (UL/DL) is assigned by the same DCI. The list of the number of scheduled downlink/uplink slot may contain one or more values for the number of scheduled downlink/uplink slot.

In some implementations, the number of scheduled transport block related information includes at least one of the following: the number of scheduled downlink transport block m0, the number of scheduled uplink transport block m2, the list of the number of scheduled downlink transport block, the list of number of scheduled uplink transport block.

In some implementations, the m1 TBs may be consecutive or some of them are consecutive. In some implementations, the m2 TBs may be consecutive or some of them are consecutive in time domain.

In some implementations, the number of scheduled uplink/downlink transport blocks m1 or m2 indicates that the resource allocation in time, frequency, or spatial domain of (no more than) m1 or m2 transport blocks (UL/DL) is assigned by the same DCI. The list of the number of scheduled downlink/uplink transport blocks may contain one or more value for the number of scheduled downlink/uplink transport blocks.

In some implementations, the slot aggregation factor including at least one of the following: uplink slot aggregation factor or pusch-AggregationFactor in the IE PUSCH-Config, downlink slot aggregation factor or pdsch-AggregationFactor in the IE PDSCH-Config. When the UE is configured with downlink slot aggregation factor that is greater than 1, the same symbol allocation is applied across the downlink slot aggregation factor consecutive slots. The UE may expect that the TB is repeated within each symbol allocation among each of the downlink slot aggregation factor consecutive slots. When the UE is configured with uplink slot aggregation factor that is greater than 1, the same symbol allocation is applied across the uplink slot aggregation factor consecutive slots and the PUSCH is limited to a single transmission layer. The UE shall repeat the TB across the uplink slot aggregation factor consecutive slots applying the same symbol allocation in each slot.

(2) DRX configuration parameters: The DRX (discontinuous reception) related parameters may include at least one of the following in the IE DRX-Config or MAC-ParametersXDD-Diff:

drx-onDurationTimer: duration at the beginning of a DRX Cycle;

drx-SlotOffset: delay before starting the drx-onDurationTimer;

drx-InactivityTimer: duration after the PDCCH occasion in which a PDCCH indicates a new UL or DL transmission for the MAC entity;

drx-RetransmissionTimerDL (per DL HARQ process): maximum duration until a DL retransmission is received;

drx-RetransmissionTimerUL (per UL HARQ process): maximum duration until a grant for UL retransmission is received;

drx-LongCycleStartOffset: long DRX cycle and drx-StartOffset which define the subframe where the Long and Short DRX Cycle starts;

drx-ShortCycle: short DRX cycle;

drx-ShortCycleTimer: duration the UE shall follow the Short DRX cycle;

drx-HARQ-RTT-TimerDL (per DL HARQ process): minimum duration before a DL assignment for HARQ retransmission is expected by the MAC entity;

drx-HARQ-RTT-TimerUL (per UL HARQ process): minimum duration before a UL HARQ retransmission grant is expected by the MAC entity;

longDRX-Cycle;

shortDRX-Cycle;

Number of DRX cycle to be started. In some embodiment, the DRX cycle could be consecutive. For example, if the number if 3, it means UE needs to monitor PDCCH "wake up" in 3 consecutive DRX cycles. In some embodiment, the first DRX cycle could be started after a time offset.

Number of drx-onDurationTimer to be started in its corresponding DRX cycle. In some embodiment, the DRX cycle could be consecutive. For example, if the number if 3, it means UE needs to monitor PDCCH or "wake up" in 3 consecutive DRX cycles. In some embodiment, the first drx-onDurationTimer could be started after a time offset.

In some embodiment, the information in the message bitmap indicating the the start or expiration of DRX cycle or drx-onDurationTimer or Active Time. In an example, if the message indicates "1001". It may mean the UE needs to monitoring PDCCH or "wake up" in first and fourth DRX cycles. It may mean the UE can skip the second and third DRX cycle. It may mean the drx-onDurationTimer in next first and fourth DRX cycles would be started. It may mean the drx-onDurationTimer would not be started in the second and third DRX cycle. It may mean the UE is expected to be active in a duration in first and fourth DRX cycles. It may mean the UE could be inactive in the second and third DRX cycle.

An example is that the value for 'drx-onDurationTimer' is less than T0 ms in the power saving parameter table or parameter table or indicated by the message, wherein T0 is no greater than 40 ms.

An example is that the value for 'drx-InactivityTimer' is less than T1 ms in the power saving parameter table or parameter table or indicated by the message, wherein T1 is no greater than 40 ms.

(3) Frequency domain parameters: The frequency domain parameters may include at least one of the following: BWP (Bandwidth part) related parameters, CA (carrier aggregation) related parameters, DC (dual connection) related parameters, frequency range related parameters, or SUL (Supplementary uplink) related parameters.

In some implementation, the BWP related information include at least one of the following: the bandwidth of BWP, the number of PRB (physical resource block) of the BWP, BWP switching time, number of active BWP, the locatioAndBandwidth or subcarrierSpacing or cyclicPrefix in the IE BWP, BWP state transition. In some example, the BWP state would include at least one of the following: active BWP, inactive BWP, dormant BWP.

In some implementation, the dormant BWP has one of the following characteristics: no downlink or uplink grant, no PDCCH monitoring. In some implementation, the dormant BWP has one of the following characteristics: the smallest bandwidth, smallest index, the smallest ID (identifier), PDCCH monitoring is disabled, uplink or downlink grant is not allowed, CSI measurement is enabled, RRM (Radio Resource Management) measurement is enabled, the number of transmission layer is limited to a first threshold value, the number of antenna ports is limited to a second threshold value, the number of antenna panel is limited to a third threshold value, the PDCCH monitoring periodicity is limited to a fourth threshold value, the package transmitted within it is no greater than a fifth threshold, the transport block within it is no greater than a sixth threshold. The first to sixth threshold values are non-negative.

In some implementation, the CA/DC related parameters include at least one of the following: Scell activation related parameter, Scell deactivation related parameter, Scell release related parameter, Scell state transition indication. The Scell state includes at least one of active state, deactivated state, dormant state. When the SCell is in the dormant state, however, the UE may perform CQI measurements and reporting or/and RRM measurement, albeit at a much sparser periodicity. When the SCell is in the dormant state, the UE may perform CQI measurements and reporting or/and RRM measurement, but PDCCH monitoring is not required. The transitioning from the dormant state to the active state is still much shorter than a transitioning from the deactivated state to the active state.

In some implementation, the frequency range includes frequency range 1 and frequency range 2. wherein frequency range 1 is the sub-6G frequency, and frequency range 2 is the above-6G frequency.

(4) The spatial domain parameter. The spatial domain parameters may include at least one of the following: antenna panel, reference resource, reference signal group, antenna port group, spatial filter group, receiving antenna, transmission antenna, transmission layer related parameters, the frequency or density or periodicity of RRM measurement, the periodicity of reference signal, the frequency or density or periodicity of CSI reporting, frequency or density or periodicity of CSI acquisition. In some embodiment, the reference signal may have at least one characteristics that are same with CSI-RS, SRS, DM-RS (demodulation reference signal), SS, PT-RS, or SS/PBCH block or include at least one of CSI-RS, SS, SRS, DM-RS, PT-RS, or SS/PBCH block. The characteristics are as follows: time/frequency/spatial pattern, time/frequency/spatial resource allocation, sequence generation scheme, initialization value, base sequence, initialization value, scrambling sequence, scrambling method, root index, circular shift value, sequence length. In some embodiment, the reference signal may have a comb-like pattern in frequency domain.

In some implementation, the antenna panel related information may include at least one of the following: antenna panel de-activation/activation/switching, the maximum number of active antenna panel. The reference resource related information may include at least one of the following: reference resource de-activation/activation/switching, the maximum number of active reference resource. The reference signal group related information may include at least one of the following: reference signal group de-activation/activation/switching, the maximum number of active reference signal group. The reference signal may include CSI-RS (Chanel State Information Reference Signal), DM-RS (Demodulation Reference Signal), SRS (Sounding Reference Signal), or PT-RS (Phase Tracking Reference Signal). Antenna port group related information may include at least one of the following: antenna port group de-activation/activation/switching, the maximum number of active antenna port group. Spatial filter group related information may include at least one of the following: spatial filter group de-activation/activation/switching or the maximum number of active spatial filter group. Receiving antenna related information may include at least one of the following: receiving antenna de-activation/activation/ switching/decrease/increment, or the maximum number of receiving antenna. Transmission antenna related information may include at least one of the following: transmission antenna de-activation/activation/switching/decrease/increment, the maximum number of transmission antenna. Transmission layer related information may include at least one of the following: transmission layer de-activation/activation/ decrease/increment or the maximum number of transmission layer.

(5) UE processing timeline related parameters: The UE processing timeline related parameter may include at least one of the following: PDSCH decoding time, CSI computation time, or UE capability. The UE capability indicates the required PDSCH decoding time, UE capability 1 and UE capability 2, the latter has a tight timeline. In some implementations, the UE processing timeline related parameter may be relaxation/increment PDSCH decoding time/CSI computation time.

(6) PDCCH monitoring related parameters: PDCCH monitoring related parameters may include at least one of the following: CORESET (Control resource set), search space, PDCCH candidate, aggregation level, CCE (control channel element), DCI format, DCI size, RNTI (Radio Network Temporary Identifier), number of blind decoding, or density or frequency of PDCCH monitoring, number of PDCCH periodicity to be monitored, the information bitmap indicating PDCCH monitoring In some embodiment, a density or frequency PDCCH monitoring f means that UE is expected to monitor PDCCH in a periodicity within every 1/f PDCCH monitoring.

In an example, if the message indicates "1001". It may mean the UE needs to monitoring PDCCH in first and fourth PDCCH periodicity. It may mean the UE can skip the second and third PDCCH periodicity.

In some embodiment, as to the number of PDCCH periodicity to be monitored, the PDCCH periodicity could be consecutive. For example, if the number if 3, it means UE needs to monitor PDCCH in 3 consecutive PDCCH periodicity. In some embodiment, the first PDCCH periodicity could be started after a time offset.

In some implementations, CORESET (Control resource set) may include at least one of the following: controlResourceSetId, frequencyDomainResources, duration or cce-REG-MappingType, interleaved, precoderGranularity, tci-StatesPDCCH-ToAddList, tci-StatesPDCCH-ToReleaseList, tci-PresentInDCI, pdcch-DMRS-ScramblingID in the IE ControlResourceSet. In some implementations, information may be de-activation/activation, CORESET, or duration update.

In some implementations, Search space may include at least one of the following: searchSpaceId, controlResourceSetId, monitoringSlotPeriodicityAndOffset, duration, or monitoringSymbols WithinSlot, nrofCandidates, searchSpaceType in the IE SearchSpace.

(7) Power saving signal/channel related parameter: The power saving signal/channel related parameters which include at least one of following: CORESET (Control resource set), search space, PDCCH candidate, aggregation level, CCE (control channel element), DCI format, DCI size, RNTI (Radio Network Temporary Identifier), number of blind decoding, PDCCH monitoring density; time/frequency domain resource allocation, periodicity and offset, the number of transmission times within a periodicity. In some embodiment, the power saving signal/channel is the signal/channel for message transmission in at least one of the schemes in Scheme 1~Scheme 6.

In some embodiment, at least one of the parameters in (1) to (7) may be associated with a BWP or cell or carrier.

FIG. 8 shows an example of a wireless communication method based on some implementations of the disclosed technology.

The method includes, at step 810, updating configuration parameters of a user device based on one more messages.

Additional features and embodiments of the above-described methods/techniques are described below using a clause-based description format.

1. A wireless communication method, comprising: updating configuration parameters of a user device based on one or more messages including at least one of a parameter update indication, a parameter update inquiry, a parameter set, or a parameter index set.
2. The wireless communication method of clause 1, wherein the one or more messages include a first message transmitted from the user device to a base station. In an example, the first message may correspond to the message described in relation to Scheme 4 above. In an example, the first message may correspond to the first message described in relation to Scheme 1 as shown in FIG. 4. In an example, the first message may correspond to the first message described in relation to Scheme 6 as shown in FIG. 7.
3. The wireless communication method of clause 2, wherein the one or more messages further include a second message transmitted from the base station or received by the user device, the second message transmitted or received after the first message. In an example, the second messages may correspond to the second messages described in relation to Scheme 1 as shown in FIG. 4. In another example, the second messages may correspond to the second message described in relation to Scheme 6 as shown in FIG. 7.
4. The wireless communication method of clause 3, wherein the one or more messages further include a third message transmitted from the user device to the base station. In an example, the third message may correspond to the third message described in relation to Scheme 6 as shown in FIG. 7.
5. The wireless communication method of clause 1, wherein the one or more messages include a first message from a base station to the user device or received by the user device. In an example, the first message may correspond to the message described in relation to Scheme 2. In an example, the first message may correspond to the first message described in relation to Scheme 3 as shown in FIG. 5. In an example, the third message may correspond to the third message described in relation to Scheme 5 as shown in FIG. 6.
6. The wireless communication method of clause 5, wherein the one or more messages further include a second message transmitted from the user device to the base station, the second message transmitted or received after the first message. In an example, the second message may correspond to the second messages described in relation to Scheme 3 as shown in FIG. 5. In an example, the second message may correspond to the second messages described in relation to Scheme 5 as shown in FIG. 6.
7. The wireless communication method of clause 6, wherein the one or more messages further include a third message transmitted from base station or received by the user device. In an example, the third message may correspond to the third messages described in relation to Scheme 5 as shown in FIG. 6.
8. The wireless communication method of any one of clauses 2 to 7, wherein at least one of the first message, second message and third message is transmitted through a Radio Resource Control (RRC) signaling. MAC Control Element (MAC CE), a Layer 1 signaling, or a reference signal.
9. The wireless communication method of clause 8, wherein the reference signal includes at least one of Sounding Reference Signal (SRS), Phase Tracking Reference Signal (PT-RS), Channel State Information Reference Signal (CSI-RS), or synchronization signal (SS).
10. The wireless communication method of any one of clauses 2 to 7, wherein the first message includes a first parameter set or a first parameter index set, the first parameter set or one or more first parameters indicated in the first parameter index set being a subset of a first parameter table.
11. The wireless communication method of any one of clauses 3, 4, 6, and 7, wherein the second message includes a second parameter set or a second parameter index set, the second parameter set or one or more second parameters indicated in the second parameter index set being a subset of a second parameter table.
12. The wireless communication method of clause 11, the first parameter table is a subset of the second parameter table, a partial part of the first parameter table is a subset of the second parameter table, or the first and second parameter tables are the same.
13. The wireless communication method of any one of clauses 1 to 12, wherein information indicated in the second transmission is interpreted based on information indicated in the first transmission.
14. The wireless communication method of clause 11, at least one of the first and second parameter tables is a subset of a power saving parameter table.
15. The wireless communication method of clause 14, wherein information included in the first message is a bitmap indicating the first parameter table or the power saving parameter table.
16. The wireless communication method of clause 11, wherein information included in the second message is a bitmap indicating the second parameter table or the information included in the first message.
17. The wireless communication method of clause 14 or 15, wherein the power saving parameter table includes at least one of discontinuous reception (DRX) configuration, PDCCH (Physical Downlink Control Channel) monitoring configuration, time domain resource allocation related parameters, BWP (Bandwidth Part) configuration, carrier aggregation (CA) related parameters, dual connection (DC) related parameters, supplementary uplink related parameters, or MIMO (Multiple Input Multiple Output) related configuration.
18. A communication apparatus comprising a processor configured to implement a method recited in any one or more of clauses 1 to 17.
19. A computer readable medium having code stored thereon, the code, when executed, causing a processor to implement a method recited in any one or more of clauses 1 to 17.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   receiving, by a user device, from a network device, a message, wherein the receiving of the message provides information on whether a discontinuous reception (DRX) on-duration timer indicating a duration of a DRX cycle of the user device starts after a time offset; and
   wherein the message is included in a physical downlink control channel (PDCCH) transmission and the DRX on-duration timer starts after the time offset in response to not receiving of the PDCCH transmission,
   performing, by the user device, an operation based on the information,
   wherein the time offset is not less than a bandwidth part (BWP) switching time, and wherein the time offset is related to a capability of the user device.

2. The wireless communication method of claim 1, wherein the message is received through a Layer 1 signaling in the physical downlink control channel (PDCCH) transmission.

3. The wireless communication method of claim 2, wherein the PDCCH transmission is received in a primary cell.

4. The wireless communication method of claim 2, wherein the Layer 1 signaling is specific for a certain group of user devices.

5. A wireless communication method, comprising:
   transmitting, by a network device, to a user device, a message that provides information on whether a discontinuous reception (DRX) on-duration timer indicating a duration of a DRX cycle of the user device starts after a time offset,
   wherein the message is included in a physical downlink control channel (PDCCH) transmission and the DRX on-duration timer starts after the time offset in response to not receiving of the PDCCH transmission,
   wherein the time offset is not less than a bandwidth part (BWP) switching time, and
   wherein the time offset is related to a capability of the user device.

6. The wireless communication method of claim 5, wherein the message is transmitted through a Layer 1 signaling in the physical downlink control channel (PDCCH) transmission.

7. The wireless communication method of claim 6, wherein the PDCCH transmission is transmitted in a primary cell.

8. A user device for wireless communication, comprising at least one processor that is configured to carry out:
   receive a message from a network device, wherein the receiving of the message provides information on whether a discontinuous reception (DRX) on-duration timer indicating a duration of a DRX cycle of the user device starts after a time offset; and
   perform an operation based on the information,
   wherein the message is included in a physical downlink control channel (PDCCH) transmission and the DRX on-duration timer starts after the time offset in response to not receiving of the PDCCH transmission, wherein the time offset is not less than a bandwidth part, BWP, switching time, and wherein the time offset is related to a capability of the user device.

9. The user device of claim 8, wherein the message is received through a Layer 1 signaling in the physical downlink control channel (PDCCH) transmission.

10. The user device of claim 9, wherein the PDCCH transmission is received in a primary cell.

11. The user device of claim 9, wherein the Layer 1 signaling is specific for a certain group of user devices.

12. An apparatus for wireless communication, comprising at least one processor that is configured to carry out:
  transmit, to a user device, a message that provides information on whether a discontinuous reception (DRX) on-duration timer indicating a duration of a DRX cycle of the user device starts after a time offset,
  wherein the message is included in a physical downlink control channel (PDCCH) transmission and the DRX on-duration timer starts after the time offset in response to not receiving of the PDCCH transmission,
  wherein the time offset is not less than a bandwidth part (BWP) switching time, and
  wherein the time offset is related to a capability of the user device.

13. The apparatus of claim 12, wherein the message is transmitted through a Layer 1 signaling in the physical downlink control channel (PDCCH) transmission.

14. The apparatus of claim 13, wherein the PDCCH transmission is transmitted in a primary cell.

* * * * *